Figure 1:
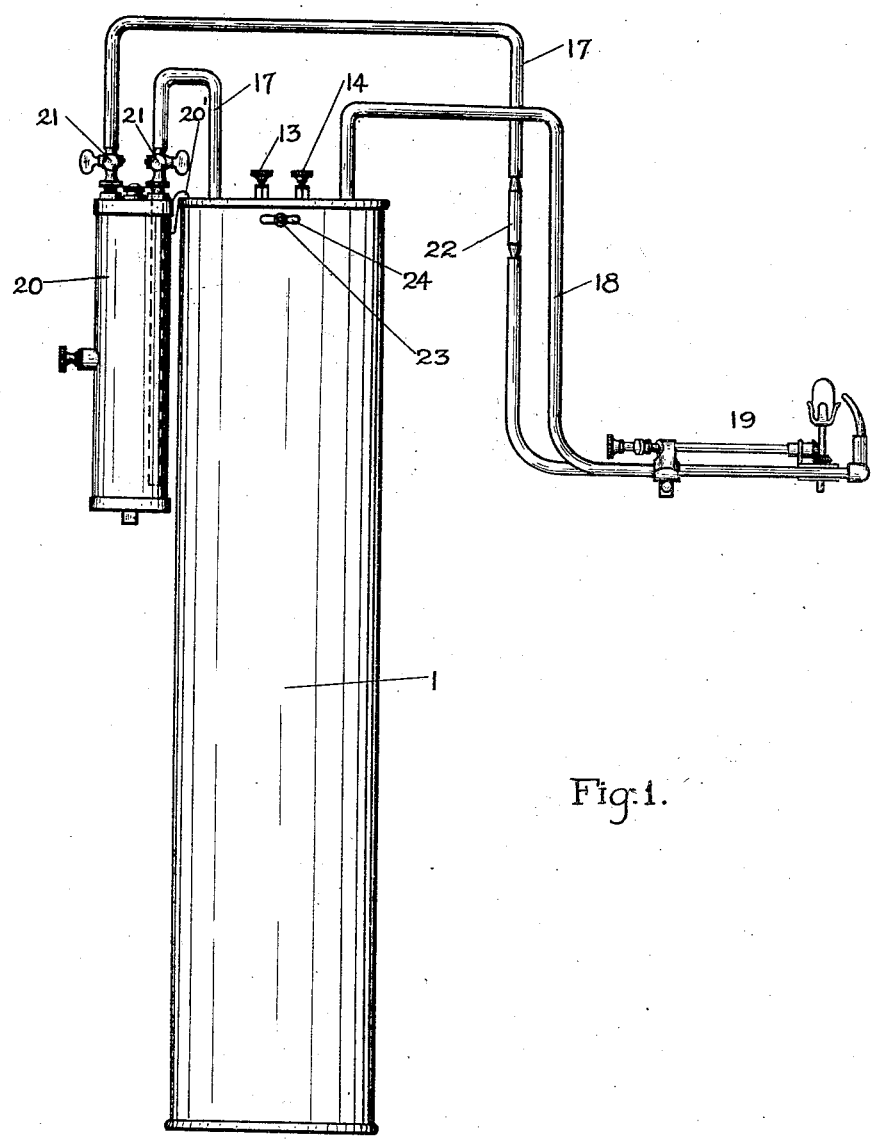

T. H. ARMSTRONG.
GAS GENERATOR.
APPLICATION FILED JULY 11, 1912.

1,049,034.

Patented Dec. 31, 1912.

2 SHEETS—SHEET 1.

Witnesses.

Inventor.
Thomas H. Armstrong.
By his Attorney.

T. H. ARMSTRONG.
GAS GENERATOR.
APPLICATION FILED JULY 11, 1912.
1,049,034.
Patented Dec. 31, 1912.
2 SHEETS—SHEET 2.
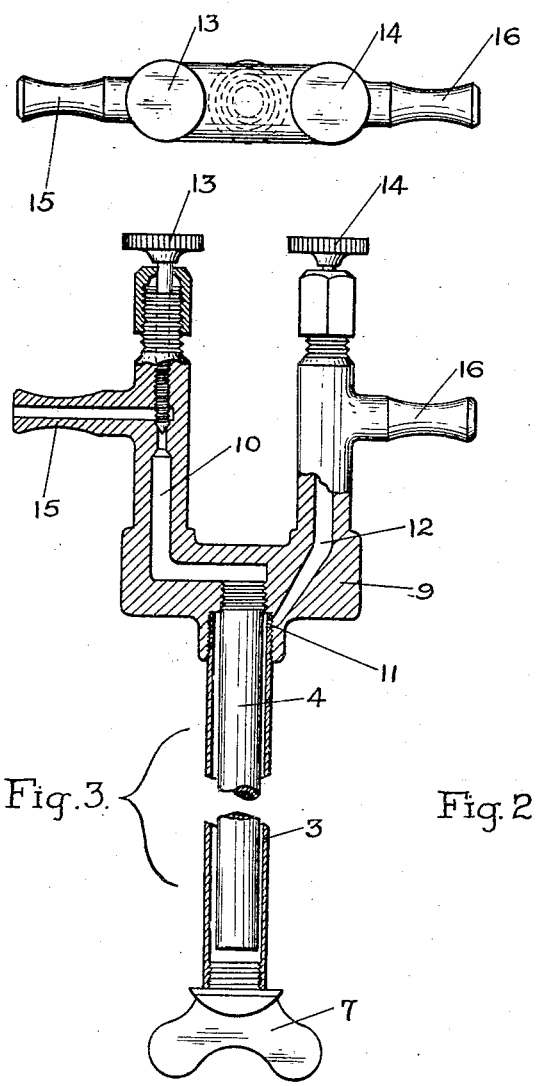
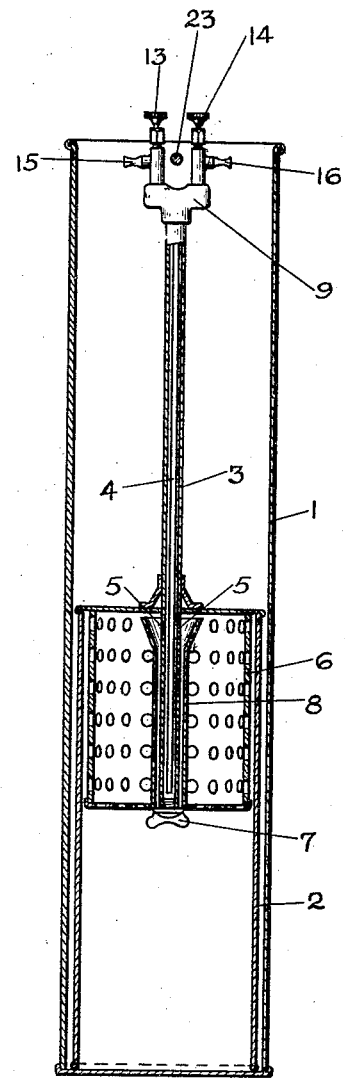
Witnesses
Romaine W. Stone
A. A. Olson
Inventor
Thomas H. Armstrong
By Joshua R. H. Potts
his Attorney.

UNITED STATES PATENT OFFICE.

THOMAS H. ARMSTRONG, OF CHICAGO, ILLINOIS, ASSIGNOR TO SOLOMON PEARLMAN, OF CHICAGO, ILLINOIS.

GAS-GENERATOR.

1,049,034.  Specification of Letters Patent.  Patented Dec. 31, 1912.

Application filed July 11, 1912. Serial No. 708,772.

*To all whom it may concern:*

Be it known that I, THOMAS H. ARMSTRONG, a citizen of the United States, and a resident of the city of Chicago, county of Cook, and State of Illinois, have invented certain new and useful Improvements in Gas-Generators, of which the following is a specification.

My invention relates to gas generating apparatus and more specifically to that class thereof designed for use particularly in the generation of gas for producing a very hot flame.

The object of my invention is the production of a gas generator of the character mentioned which will be durable and economical in construction, which may be readily and easily operated and which will be efficient in operation.

Other objects will appear hereinafter.

With these objects in view, my invention consists in the combinations and arrangements of parts hereinafter described and claimed.

My invention will be best understood by reference to the accompanying drawing forming a part of this specification, and in which—

Figure 1 is a side elevation of a gas generating apparatus embodying my invention, Fig. 2 is a central vertical section of the oxygen generator included in the construction, Fig. 3 is an enlarged sectional side elevation of the gas outlet pipe shown in Fig. 2, and Fig. 4 is a top plan view of the construction shown in Fig. 3.

The preferred form of construction as illustrated in the drawings comprises a cylindrical vessel 1 which is open at its upper end. Arranged within the vessel 1 at the lower end thereof is a vertically movable vessel 2 which is inverted, the lower end of said vessel being open. Leading from the upper end of vessel 2 are pipes 3 and 4, said pipes being coaxial, with pipe 4 arranged within pipe 3 and so that an annular passage will be formed in pipe 3 surrounding pipe 4. Communication between the interior of pipe 3 and the upper end portion of vessel 2 is established through diametric openings 5 provided in said pipe. The lower end of pipe 4 is open so that in use, a portion of the gas passing into the annular passage formed in pipe 3 will pass into pipe 4 through the open lower end thereof.

Arranged within the vessel 2 at the upper end thereof is a foraminated container 6 in which, when the device is in operation, is provided the solid chemical, such as ozone or oxylithia which, when brought into contact with water, will liberate oxygen gas. The container 6 is secured in position in the upper end of vessel 2 by means of a thumb screw 7 which is in threaded connection with the lower end of pipe 3 as clearly shown in Fig. 2. The container 6 is formed with a co-axial tubular portion 8 for the accommodation of the lower end of pipe 3, the upper end of the tubular portion 8 being flared as shown in order to facilitate insertion of pipe 3 thereinto. With this arrangement it will be seen that container 6 is releasably secured in position permitting of said container being readily detached when desired for introducing the chemical thereinto or for replenishing the supply in said container.

Connected with the threaded upper ends of pipes 3 and 4 is a fitting 9. Formed in said fitting is a passage 10 which communicates with the adjacent end of pipe 4, the annular passage through pipe 3 communicating through port 11 with a passage 12 provided in said fitting. The passages 10 and 12 are governed by manually adjustable needle valves 13 and 14 respectively, the passages 10 and 12 terminate at their outer ends in nipples 15 and 16 respectively which are connected with flexible tubes or pipes 17 and 18 respectively, said pipes 17 and 18 leading to a burner 19 which may be of any ordinary or preferred design.

Interposed in the pipe 17 is a carbureter 20 which is releasably supported upon the vessel 1 by means of a hook 20′ which is provided at the upper end of said carbureter and which releasably engages over the upper edge of said vessel. The carbureter 20, when the device is in operation, is adapted to contain a liquid chemical such as ether for effecting the carburation of the oxygen gas passing through the pipe 17. Valves 21 are provided for governing the flow of gas to and from said carbureter. Also interposed in the pipe 17 is a safety device 22 of conventional construction for arresting sparks, preventing the passage thereof rearwardly in pipe 17 to the carbureter.

In the operation of the apparatus, the solid chemical is first supplied to the container 6. The latter is then secured in position in the upper end of vessel 2 which is then arranged in the vessel 1 as clearly shown in Fig. 2. Water is then introduced into vessel 1, the water thus introduced immersing the vessel 2 and flowing upwardly through the open lower end of said vessel into the interior of the latter into contact with the chemical carried in container 6. The oxygen gas which is liberated in the vessel 2 will rise in the latter and accumulate in the upper end thereof passing from the latter through the openings 5 into pipes 3 and 4. The gas passing through pipe 3 will be directed to the carbureter 20 whence the same will pass to the burner 19, the gas passing through pipe 3 being conducted directly to the burner for mixture with the carbureted gas passing through pipe 17 to support an oxy-hydrogen flame at the burner. A pencil of lime is provided at the burner against which the flame impinges causing said pencil to be heated to incandescence as will be understood by those skilled in the art. In the operation of the device, heat accompanies the generation of oxygen in the vessel 2, the oxygen liberated being comparatively hot. By arranging the pipe 4 within the pipe 3, the gas passing through said pipe will be maintained in its heated condition by reason of the protection afforded by the heat of pipe 3 and the gas passage which immediately surrounds said pipe 4.

Since the evaporation of ether or other suitable chemical, in the carbureter greatly reduces the temperature therein, it is desired to deliver the gas from pipe 4 in its heated condition to the carbureter to prevent lowering the temperature therein beyond a point at which carburation is impaired.

In the operation of the device the accumulation of gas in the upper end of vessel 2 will result in a pressure being formed therein which causes said vessel to be elevated. Such elevation of said vessel is limited by means of a transversely extending pin 23 provided in the upper end of vessel 2 which is adapted to contact with the upper side of fitting 9, a thumb nut 24 being provided threaded upon one end of pin 23 to lock said pin in position and prevent accidental displacement thereof. Upward movement of the vessel 2 being limited, the excess generation of gas in the vessel 2, after the latter has reached its upper terminal of movement, will cause the water contained in the lower end of said vessel to be forced downwardly around the lower end of said vessel and upwardly in vessel 1. Thus the water contained in vessel 1 will serve as a means of automatically governing the pressure in the vessel 2, resulting in uniform pressure being maintained which, as will be understood, is of material advantage in the production of a non-flickering flame at the burner.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:

1. A gas generator comprising a vessel; a second vessel arranged within said first vessel and having its lower end open; a foraminated container mounted within said second vessel; and two co-axial gas outlet passages leading from said second vessel, substantially as described.

2. A gas generator comprising a vessel; a second vessel arranged within said first vessel and having its lower end open; a foraminated container mounted within said second vessel; and two outlet pipes arranged one within the other leading from said second vessel, substantially as described.

3. In a gas generator, the combination of a vessel having a gas chamber therein; and two gas outlet pipes arranged one within the other leading from said gas chamber, substantially as described.

4. In a gas generator, the combination of a vessel having a gas chamber therein; two gas outlet pipes arranged one within the other leading from said gas chamber; and valves governing the flow through said gas outlet pipes, substantially as described.

5. A gas generator comprising a vessel; a second vertically movable vessel arranged within said first vessel at the lower end thereof, the lower end of said second vessel being open; co-axial gas outlet pipes leading from the upper end of said second vessel; and a foraminated container mounted within said second vessel and supported in the upper end of the latter by one of said gas outlet pipes, substantially as described.

In testimony whereof I have signed my name to this specification in the presence of two subscribing witnesses.

THOMAS H. ARMSTRONG.

Witnesses:
A. A. OLSON,
JOSHUA R. H. POTTS.

Copies of this patent may be obtained for five cents each, by addressing the "Commissioner of Patents, Washington, D. C."